though apparently simple it will be found upon thorough examination to be practical and entirely efficient for the purposes it is designed to accomplish.

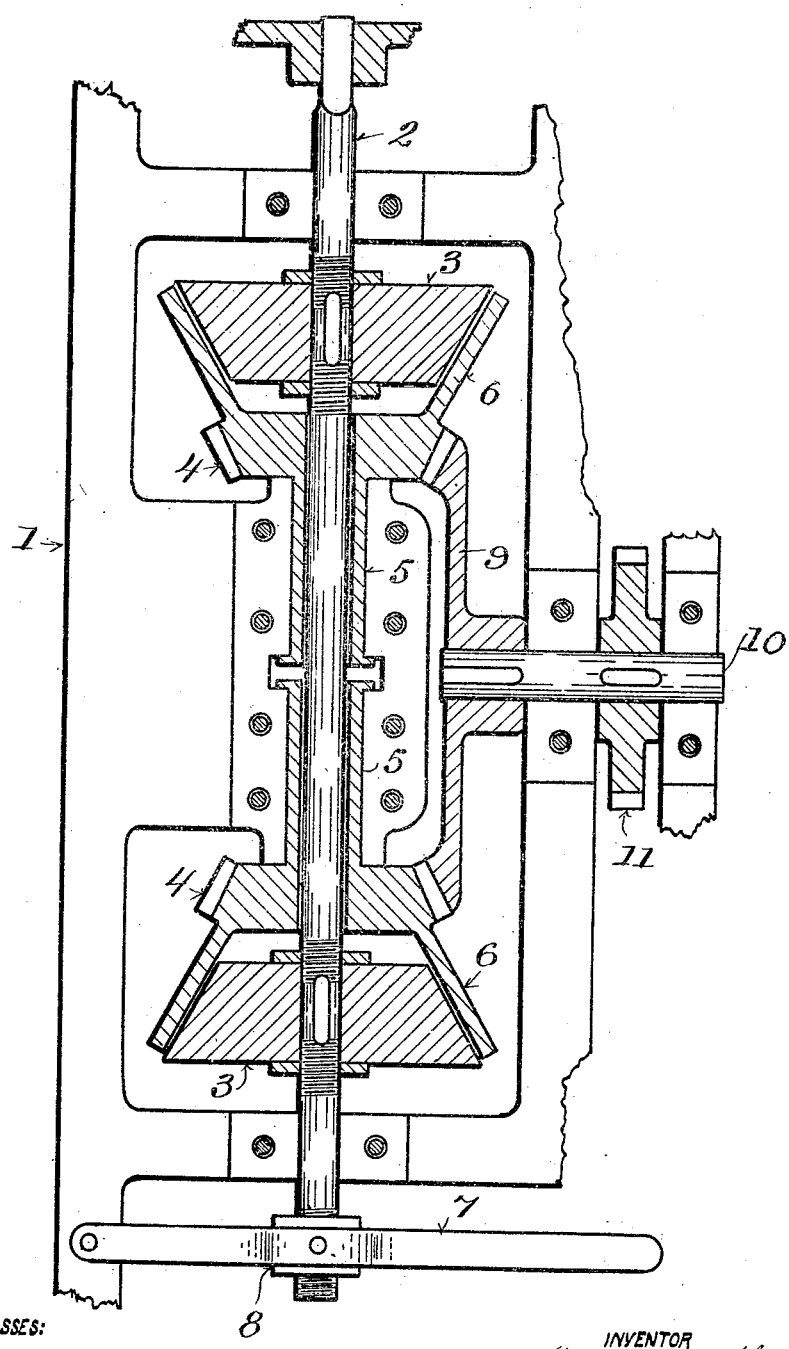

UNITED STATES PATENT OFFICE.

WILLIAM K. BLACKBURN, OF MILWAUKEE, WISCONSIN.

TRANSMISSION-GEARING.

No. 903,952.

Specification of Letters Patent.

Patented Nov. 17, 1908.

Application filed July 31, 1908. Serial No. 446,247.

*To all whom it may concern:*

Be it known that I, WILLIAM K. BLACKBURN, a citizen of the United States, and resident of Milwaukee, in the county of Milwaukee and State of Wisconsin, have invented certain new and useful Improvements in Transmission-Gearings; and I do hereby declare that the following is a full, clear, and exact description thereof.

My invention consists in certain peculiarities of construction and combination of parts hereinafter set forth with reference to the accompanying drawing and subsequently claimed, its object being to provide simple, positive, and durable gearing, the arrangement and construction of which is such that motion in one direction from a power-shaft is quickly and positively transmitted to a counter-shaft in either direction, the gearing being in constant mesh.

The drawing represents a sectional plan view of a transmission gearing embodying the features of my invention, the parts being shown in position wherein the power-shaft gearing is uncoupled from the counter.

Referring by numeral to the drawing, 1 indicates a frame, in bearings of which is mounted a power-shaft 2, the shaft being provided with oppositely disposed conical clutch members 3 that are secured to said shaft. Beveled pinions 4 are loosely mounted upon the shaft having collared sleeve extensions 5, which extensions are held against end-thrust by bearings of the frame located between the beveled pinions and collared ends of their respective sleeves. Each bevel pinion is provided with a rearwardly extending conical shell 6 into which is housed the clutch-members 3, said clutch-members being arranged to be alternately forced into frictional engagement with the shells. Engagement of the clutch-members and shells is accomplished by means of a lever 7 fulcrumed to the frame 1 and in spanner-engagement with a grooved collar 8 fast on the power-shaft 2. By this construction it is apparent that when the power-shaft is moved longitudinally in either direction by the lever, from the position shown in the drawing, one or the other of the beveled pinion shells will be engaged by the adjacent clutch-member whereby a rotation of said pinions is effected. Meshing with both beveled pinions 4 is a beveled gear-wheel 9, which gear-wheel is secured to a counter-shaft 10, this shaft being mounted in bearings of the frame and carrying a toothed sprocket-wheel 11 for transmitting motion by a chain (not shown) to a vehicle-axle or any mechanism desired to be actuated.

From the foregoing described gearing, it is obvious that the power-shaft driven in one direction, will cause the counter-shaft to rotate in either direction at the will of the operator, or said counter-shaft may be disconnected from the power-shaft entirely, depending upon the position of the clutch-members, and when either pinion is operating to drive the aforesaid counter-shaft, the opposite pinion is idly rotated in a reverse direction by the gear-wheel, thus serving as a counter-balance.

It should be understood that in some instances, for the toothed beveled pinions and gear-wheel, friction-gears may be substituted, but in either instance the reversing mechanism is the same, which mechanism comprises the conical clutch-members and their conical shells or housing carried by the beveled pinions.

I claim:

In transmission gearing, a power shaft, conical clutch-members secured to the power-shaft, oppositely disposed beveled faced pinions loosely mounted upon said power-shaft and having conical shells extending therefrom for frictional engagement with said clutch-members, means for holding the bevel-faced pinions against end-play upon the aforesaid power-shaft, a counter-shaft, a beveled-faced wheel carried by the counter-shaft adapted to have constant engagement with both of the aforesaid bevel-faced pinions, and means for imparting longitudinal motion to the power-shaft whereby the bevel-faced pinions are alternately engaged by the clutch-members.

In testimony that I claim the foregoing I have hereunto set my hand at Milwaukee, in the county of Milwaukee and State of Wisconsin in the presence of two witnesses.

WILLIAM K. BLACKBURN.

Witnesses:
GEORGE FELBER,
N. E. OLIPHANT.